Aug. 16, 1966 P. ARBEL 3,266,679
HOPPER WAGONS

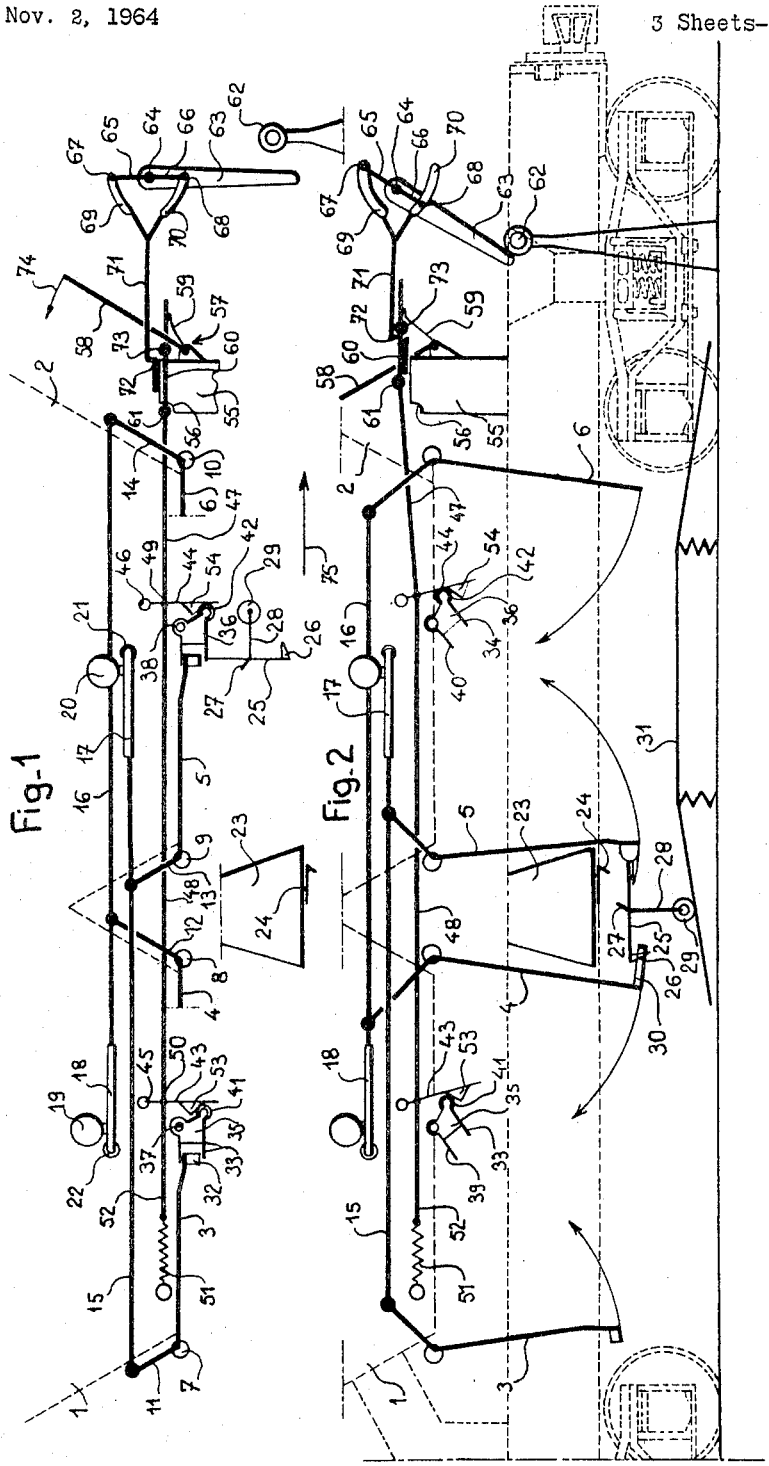

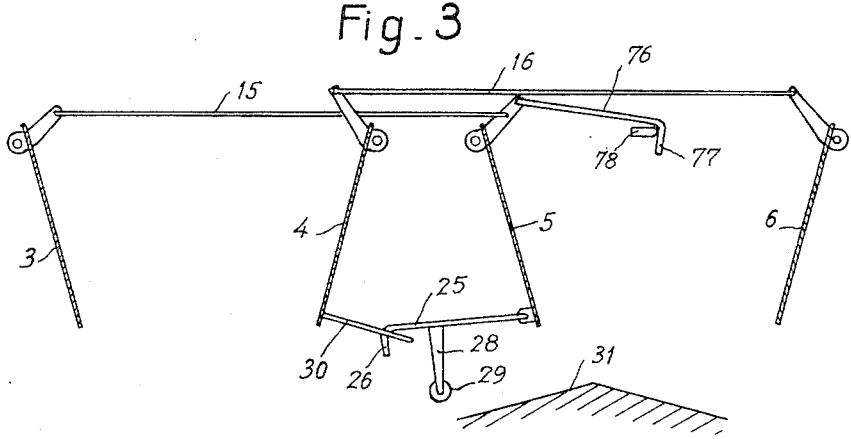
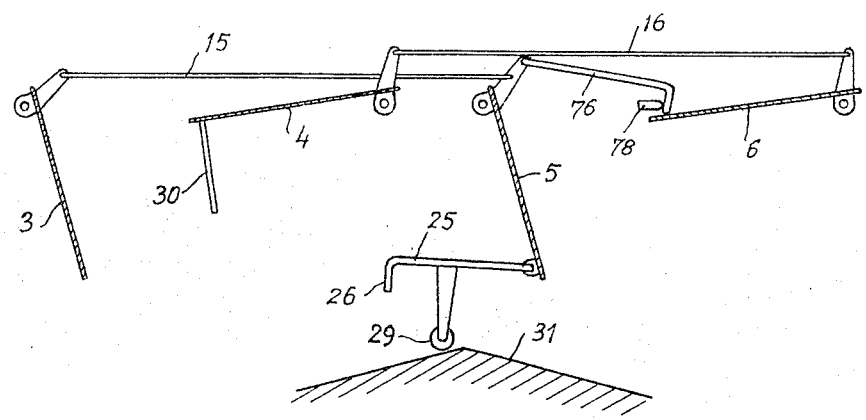
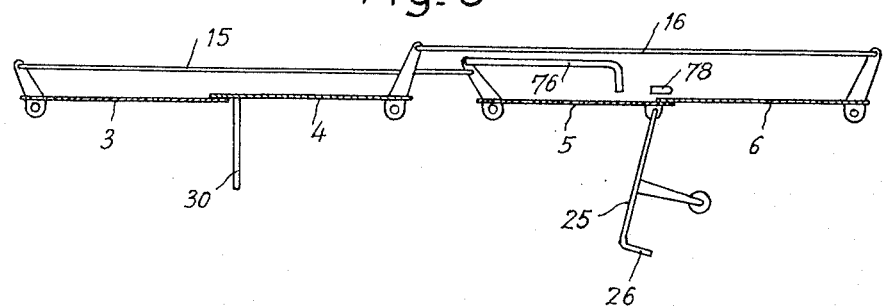

Filed Nov. 2, 1964 3 Sheets-Sheet 3

Inventor
Pierre Arbel
By Stevens, Davis, Miller & Mosher
Attorneys

United States Patent Office 3,266,679
Patented August 16, 1966

3,266,679
HOPPER WAGONS
Pierre Arbel, Paris, France, assignor of one-half to Etablissements Arbel, Paris, France, a corporation of France
Filed Nov. 2, 1964, Ser. No. 408,107
Claims priority, application France, Nov. 7, 1963, 953,003, Patent 84,679
6 Claims. (Cl. 222—503)

The invention relates to hopper wagons, and in particular to arrangements for the control of the trap doors of such wagons having an arrangement for the automatic control of the opening and closing of the hoppers of the wagon wherein the wagon is fitted with one or more sets of at least two shut-off systems, each shut-off system comprising a master trap door and a supported trap door, the edge of the supported trap door being covered by that of the master trap door in the closed position in such a way that the master trap door holds the supported trap door closed. Articulated rods are provided which connect together on the one hand the group of master trap doors, and connect together on the other hand the group of supported trap doors in such a way that the trap doors in each of the groups pivot as a whole. Each set of shut-off systems comprises two return members, each return member pulling separately and permanently in the direction of closing of groups of trap doors. A supported trap door is equipped with one of two hooking elements of a first locking system comprising a latch and a holding member arranged in such a way that said latch engages automatically said holding member when the trap doors reach the open position, at least the supported trap doors being thus held in said position, and that said two hooking elements are separated from each other under the action of a cam or ramp fixed to the ground and arranged in the path of a feeler fixed to said latch.

The object of the invention is to provide the above described hopper wagons with a device ensuring the closure of the trap doors in the correct order with great safety, that is to say the closure of the supported trap-doors takes place before that of the master trap-door.

According to the invention this object is achieved by equipping a master trap-door with one of two hooking elements of a second locking system comprising a hook and a holding piece, the other hooking element being connected to the chassis of the wagon in such a way that said hook engages automatically said holding piece when the trap doors reach the open position. Said second locking system further is controled in such a way by a supported trap-door that said supported trap-door unlocks said second locking system only after having reached a position near the closed position during its closing movement.

A number of forms of construction according to the invention will now be described by way of examples, references being made to the accompanying drawings, in which:

FIGURES 1 and 2 are diagrammatic views of a system of levers and rods coupling together the trap-doors of the groups of master trap-doors and supported trap-doors with a device for controlling the opening and closure of the trap-doors of a hopper wagon to which the invention may be applied. The trap-doors are shown closed in FIGURE 1 and open in FIGURE 2.

FIGURES 3, 4 and 5 show diagrammatically a part of the members shown in FIGURES 1 and 2, but provided with a form of construction of the device according to the invention. The trap-doors are shown locked in the open position in FIGURE 3, in course of closing in FIGURE 4 and closed in FIGURE 5.

Figure 6:
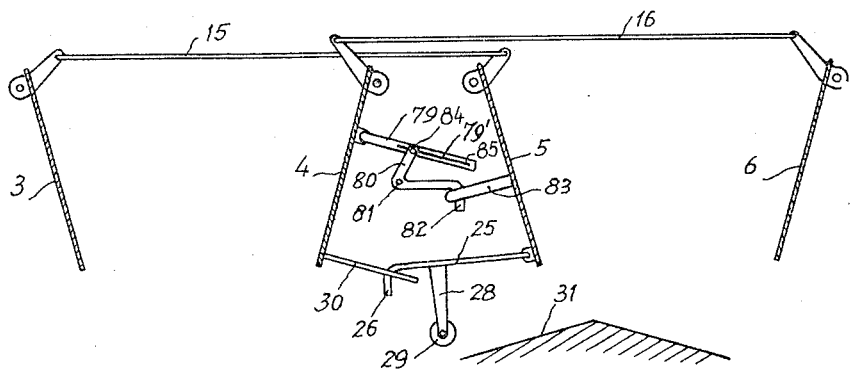
FIGURES 6, 7 and 8 show diagrammatically a part of the members shown in FIGURES 1 and 2, but equipped with a further form of construction of the device according to the invention. The trap-doors are shown respectively open, in course of closure and closed.
Figure 7:
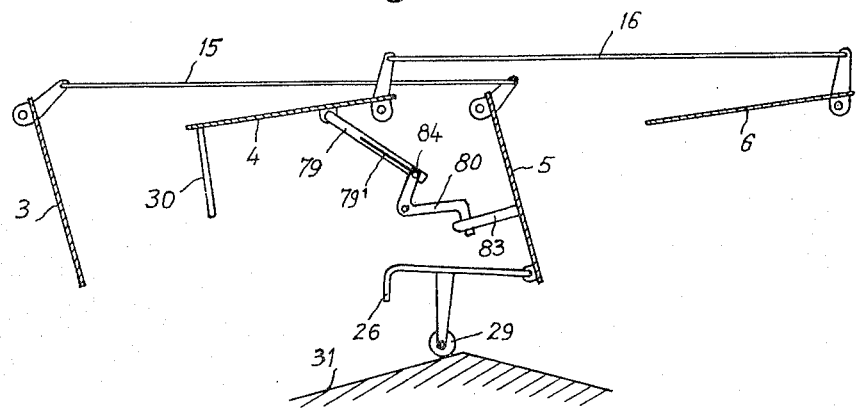
Figure 8:
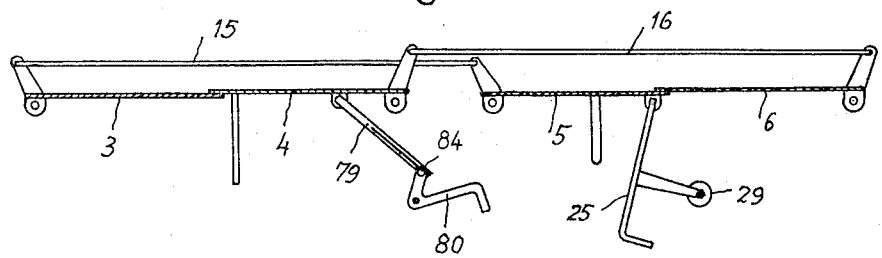

Referring to FIGURES 1 and 2, hoppers 1 and 2 (shown in broken lines) have master trap-doors 3 and 5, respectively, and supported trap-doors 4 and 6, respectively. In FIGURE 1 the trap doors 4 and 6 are shown only in part. In the drawing, the fixed points of articulation are indicated by circles and the movable points of articulation by points or filled-in circles.

The length of the trap-doors 3, 5, 4 and 6 is such that the edge of the master trap-doors 3 and 5 covers the edge of the supported trap-doors 4 and 6, respectively, when the trap-doors are closed, so that the trap-doors 3 and 5 support the trap-doors 4 and 6 in the closed position.

The trap-doors 3, 4, 5 and 6 are hinged on the fixed axes 7, 8, 9 and 10, respectively, and actuated by arms of levers 11, 12, 13 and 14, respectively, fixed to the trap-doors.

Articulated rods or connecting rods 15 and 16 connect, respectively, the ends of the levers 11 and 13 of the master trap doors 3 and 5 to the shank of the piston of a hydraulic actuator 17, and the ends of the levers 12 and 14 of the supported trap doors 4 and 6 to the stem of the piston of another hydraulic actuator 18.

The hydraulic actuators 18 and 17 have accumulators 19 and 20, respectively, the accumulators being filled partially with compressed gas and partially with a hydraulic fluid. Membranes arranged in the accumulators 19 and 20 separate the gas from the fluid. The fluid, which occupies the lower part of the accumulator 19 and 20, is in direct communication with the actuators 18 and 17, respectively. The actuators 17 and 18 are hinged on the axes 21 and 22, respectively, and are mounted on the chassis of the wagon.

The wagon is provided with a double stop 23 which limits the movement of the trap doors 4 and 5.

On the master trap-door 5 is hinged a latch 25 provided with a beak 26, and a feeler 28 which ends in a roller 29. The supported trap-door 4 has a holding member 30 in the form of a staple which the beak 26 of the latch 25 locks in when the trap-doors 4 and 5 reach their open position (see FIGURE 2).

A ramp 31 fitted with springs is provided at the exit of the discharge workings at the point selected for the closing and locking of the trap-doors after the discharge of the contents of wagon.

The master trap-doors 3 and 5 are also provided with lateral stops such as the lateral stop 32 of the master trap-door 3. These lateral stops rest, when the trap-doors 3 and 5 are closed, on the lower beaks 33 and 34 of the locking keeps 35 and 36. The keeps 35 and 36, which are hinged on pins 37 and 38 fixed to the chassis of the wagon, also have upper beaks 39 and 40, respectively, arranged parallel to the lower beaks 33 and 34, respectively, in such a way that the lateral stops of the trap-doors 3 and 5 are placed, when the trap-doors are closed, between the respective upper and lower beaks. The ends of the keeps which are opposed to the beaks carry rollers 41 and 42.

Locking latches 43 and 44, respectively supported by pins 45 and 46 fixed to the chassis, partially embrace the rollers 41 and 42 and in the closed position (FIGURE 1) immobilize the locking keeps 35 and 36.

Bars 47 and 48 are hinged on the latches 43 and 44 by the axes 49 and 50, respectively, and are intended to hold the latches 43 and 44 in the locking position (FIG- URE 1) or to bring the latches 43 and 44 into the unlocking position (FIGURE 2). In the latter case the rollers 41 and 42 are freed and the locking keeps 35 and 36 are able to swing round, pushed by the lateral stops of the master trap-doors 3 and 5.

A spring 51 connected by a bar 52 to the axis 50 permanently pulls the latches 43 and 44 in the direction of locking.

The latches 43 and 44 are provided respectively with beaks 53 and 54 which prevent the keeps 35 and 36 from taking up the closed position before the stops of the master traps 3 and 5 come into contact with the upper beaks 39 and 40 of the keeps 35 and 36, and push the keeps 35 and 36 upwards, pulling on the spring 51 through the agency of the bar 52.

A blocking member 55 fixed to the chassis of the wagon has a shoulder 56 and serves to support a manual control arrangement 57, which comprises a pivoting safety lever 58 provided with a finger 59.

The bar 57 which controls the locking latches 43 and 44 is provided at one of its ends with a fork 60 having a transverse pivot 61, which is applied against the shoulder 56 of the blocking member 55 when the latches 43 and 44 have assumed the locking position. The bar 57 is thus itself blocked and prevents any undesired movement of the locking latches 43 and 44 and also of the keeps 35 and 36.

The unlocking of the trap-doors is controlled by a stop 62 forming part of the fixed installation of the discharge station of the wagon. This stop 62 is placed in the path of the free end of a lever 63, mounted to pivot on a shaft 64 fixed to the chassis of the wagon. Pivoting around the same axis as the lever 63, and fixed to the lever 63, is a small straight lever with two arms 65 and 66 which engage, by pins 67 and 68, link bars 69 and 70 connected to a common bar 71. In the position of rest the straight lever is perpendicular with respect to the common bar 71.

The hooking elements formed by a hook 72 arranged at the free end of the common bar 71 and by a transverse pivot 73 arranged parallel to the transverse pivot 61 on the hook 60 allow of connecting the common bar 71 temporarily to the bar 47. The hooking elements and the blocking member 55 are arranged in such a way that the hook 72 does not engage the fork 60 at the transverse pivot 73 when the transverse pivot 61 of the fork 60 is engaging the shoulder 56, and so that it is necessary to disengage the fork 60 from the shoulder 56 by lifting the fork 60 in order to engage the hook 72 in the fork 60. In other words, in order to permit the bar 47 to bring the latches 43 and 44 into the open position (FIGURE 2) it is necessary to lift the fork 60, which disengages the pivot 61 from the shoulder 56 and at the same time engages the hook 72 of the bar 71 with the fork 60 of the bar 47. By moving the safety lever 58, which is provided with the finger 59, in the direction of the arrow 74 (FIGURE 1), the finger 59 lifts the fork 60, which then engages the hook 72, and results in disengaging the pivot 61 from the shoulder 56. It is then sufficient for the end of the lever 63 to meet the stop 62, in the course of the travel of the wagon, for the pivoting of the lever 63 in one direction or the other to bring about the unlocking of the trap-doors, which trap-doors then open under the weight of the material in the hoppers.

The functioning of the arrangement is as follows:

The wagon, in running order as it arrives at the discharge station, is shown in FIGURE 1, the mechanism after the opening of the trap-doors being shown in FIGURE 2.

If it is desired to empty the hoppers 1 and 2, the safety lever 58 is pushed from its running position, as shown in FIGURE 1, into the discharge position shown in FIGURE 2. The pivoting of the lever 58, which is brought about before the passage of the wagon onto the discharge pits, causes the pivoting of the finger 59, which lifts the fork 60 and frees it from the shoulder 56, thereby connecting the bar 47 to the common bar 71. The wagon is then ready for discharging.

Assuming that the wagon has been drawn across the discharge station in the direction of the arrow 75, at the point selected for discharge the lever 63 meets the fixed stop 62, which causes this lever 63 to swing over. This moves the link bar 69 and, through the bars 71, 47 and 48, the latches 43 and 44, the beaks 53 and 54 of which disengage from the rollers 41 and 42. This allows the keeps 35 and 36 to swing round, pushed by the load supported by the trap-doors. The trap-doors and the associated mechanism of the wagon are then brought into the position shown in FIGURE 2. Then the unlocking lever 63 re-assuming its vertical position, the link bar 68, in its movement to the right, brings the safety lever 58 into the running position again and at the same time lowers the finger 59 as shown in FIGURE 1. This may be done for example by means of a lateral stop (not shown) arranged on the fork 60. The lateral stop on the fork 60 causes the lever 58 to swing into the position shown in FIGURE 1 when the fork 60 is engaged by the hook 72. During the closing of the trap-doors the fork 60 of the bar 47 is free to take up the blocking position shown in FIGURE 1.

During discharge of the material from the wagon, the material presses the trap-doors 4 and 5 against the double stop 23, the beak 26 of the latch 25 on the trap-door 5 is engaged in the holding member 30 fixed to the trap-door 4. The trap-doors are thus held open until the moment when the roller 29 of the feeler 28 meets, at the exit of the discharge station, the ramp 31 placed at the point selected for the closing of the trap-doors. When the roller 29 rises up the slope of the ramp 31 it pushes up the latch 25, and the beak 26 comes out of the staple 30 freeing on the one side the supported trap door 4 which, under the action of the jack 18, closes bringing the trap-door 6 with it as they are coupled by the bar 16, and on the other side the master trap-door 5 which, under the action of the actuator 17, closes bringing the trap-door 3 with it as they are coupled by the bar 15. The two master trap-doors 3 and 5, in closing, have met the upper beaks 39 and 40 of the keeps 35 and 36 and have pushed them upwards. In this way the latches 43 and 44 and also the bar 47 with its fork 60 are able to take up again their closed and locked position, following which the wagon is ready to receive a new load.

During the opening of the trap-doors the fluid in the actuators 17 and 18 has been forced back in part into the accumulators 19 and 20, thus increasing the pressure of the contained gas. The accumulators 19 and 20 thus store up the energy required for the closing of the trap-doors. During the storage of energy, the fluid of the accumulators 19 and 20 is partly sent back to the actuators 18 and 17 respectively. This process repeats automatically at all operations of discharge.

The object of the present invention is to ensure the closure of the trap-doors in the correct order, that is to say the supported trap-doors will close before the master trap-doors.

If reference is made to FIGURE 3, representing one form of construction according to the invention, it can be seen that in the case of a wagon with two hoppers, the group of master trap-doors is shown at 3 and 5, and that of the supported trap-doors at 4 and 6. The master trap-doors 3 and 5 are connected to each other by the rod 15 and the supported trap-doors 4 and 6 by the rod 16. These rods are coupled in turn to the lifting actuators. The supported trap-door 4 is provided with a holding member 30 in the form of a catch in which can engage the nose 26 of the latch 25 articulated on the trap-door 5. The supporting arm of the master trap-door 5 carries an additional latch 76 articulated on this arm and provided with a hook or similar member 77 intended to come into engagement with a holding piece 78 carried by the frame of the wagon.

The latch 25 carries an arm 28 provided with the roller 29 forming a feeler. The closure ramp on the track is indicated at 31.

When the control mechanism is unlocked and the trap-doors open under the pressure of the load, the nose 26 of the trap-door 5 becomes engaged in the holding member 30, and at the same time the hook 77 of the latch 76 is engaged on the holding piece 78.

The hoppers having emptied themselves and the wagon continuing to move forward, during the passage of the roller 29 of the arm 28 over the closure ramp 31, the nose 26 of the latch 25 is freed from the holding member 30 of the supported trap-door 4 and, the latter being no longer held open, closes under the action of the corresponding oleo-pneumatic actuator. The same procedure follows for the supported trap-door 6, coupled to the trap-door 4.

At the end of its travel of closure, the trap-door 6 strikes against the hook 77 and disengages it from the holding piece 78; the master trap-door 5 which was held open by this hook closes immediately under the action of its actuator, causing the closure of the master trap-door 3.

The trap-doors are then automatically locked by the locking keeps 35 and 36 (FIGURE 1). This improvement in the closure of the trap-doors thus prevents reversal of the closure order of the trap-doors for any reason (master trap-door before the supported trap-door).

The wagon is then ready to receive a new load.

FIGURE 2 shows the trap-doors in course of closure and FIGURE 3 the trap-doors completely closed.

It should be noted that the hook 26 of the latch 25, if this latter were articulated on the supported trap-door 4, could become hooked on a fixed point of the frame without thereby modifying the operation of the device.

An alternative form of embodiment is shown in FIGURES 4, 5 and 6.

In these figures, there can be seen, as in the case of the previous figures, the latch 25 of the master trap-door 5 adapted to engage in the holding member 30 of the supported trap-door 4, the arm 28 of the latch carrying the roller 29 which engages a closure ramp 31.

On the master trap-door is pivoted an arm 79 with a slide 79′, in which engages a stud 84 of one of the arms of the bell-crank lever 80 articulated on the frame at 81, the other arm of which is provided with a hook 82. This hook 82 can come into engagement with the holding piece 83 carried by the master trap-door 5. The slide 79′ comprises a bottom or an end-of-travel abutment 85 which engages with the stud 84 during the closure operation, thereby causing a pivotal movement of the bell-crank lever 80.

When the general mechanism is unlocked, the trap-doors open under the pressure of the load, as shown in FIGURE 4, and the trap-doors 4 and 5 are hooked to each other through the intermediary of the latch 25, the hook 26 of which engages in the holding member 30. At the same time, the hook 82 of the bell-crank lever 80 is engaged in the holding piece 83 of the master trap-door 5 when the supported trap-door 4 opens.

The wagon being discharged and continuing its travel, during the passage of the roller 29 of the arm 28 of the latch 25 over the closure ramp 31, the hook 26 is freed from the holding member 30 and the supported trap-door 4 is no longer retained and closes under the action of the oleo-pneumatic actuator. At the end of the closure travel of this trap-door 4, the limit stop 85 of the slide 79′ of the arm 79 causes the bell-crank lever 80 to pivot and the stud arm of this lever actuated by the end of the slide playing the part of an abutment, causes the bell-crank lever to pivot, which disengages the hook 82 of the holding piece 83 from the master trap-door 5 and the latter closes under the action of the oleo-pneumatic actuator. The end trap-doors 3 and 6 have been closed before the trap-doors 4 and 5.

These trap-doors are thus interlocked in the desired order without other intervention, and the wagon is ready to receive a fresh load.

It will be noted that, as in the arrangement of FIGURES 1, 2 and 3, if the hook 26 of the latch 25 were articulated on the supported trap-door 4, the hook 26 could be engaged on any fixed point of the frame without thereby modifying the operation of the device.

It will of course be understood that the devices described above have only been given by way of examples and that numerous alternative forms may be given to the device within the scope of the invention. In particular, the arrangements which have just been described by way of examples may be applied to wagons with more than two hoppers or shut-off systems, in which case it is sufficient to provide only as many master trap-doors, supported trap doors, catches for locking and bars or corresponding rods as there are shut-off systems.

I claim:

1. A hopper wagon comprising a chassis and having an arrangement for the automatic control of the opening and closing of the hoppers of the wagon wherein the wagon is fitted with one or more sets of at least two shut-off systems, each shut-off system comprising a pivotally mounted master trap-door and a pivotally mounted supported trap-door, the edge of the supported trap-door being covered by that of the master trap-door in the closed position in such a way that the master trap-door holds the supported trap-door closed, articulated rods being provided which connect together through lever-arms fixed on said trap-doors on the one hand the group of master trap-doors and connect together on the other hand the group of supported trap-doors in such a way that the trap-doors in each of the groups pivot as a whole, each set of shut-off systems comprising two return members, each return member pulling separately and permanently in the direction of closing of groups of trap-doors, one of said supported trap-doors being equipped with one of two hooking elements of a first locking system comprising a latch and a holding member arranged in such a way that said latch engages automatically said holding member when the trap-doors reach the open position, at least the supported trap-doors being thus held in said position, and that said two hooking elements be separated from each other under the action of a cam or ramp fixed to the ground and arranged in the path of a feeler fixed to said latch, said master trap-door being equipped with one of two hooking elements of a second locking system comprising a hook and a holding piece, the other hooking element being connected to the chassis of the wagon in such a way that said hook engages automatically said holding piece when the trap-doors reach the open position, said second locking system further being controlled in such a way by a supported trap-door that said supported trap-door unbolts said second locking system only after having reached a position near the closed position during its closing movement.

2. A hopper wagon according to claim 1, wherein said second locking system comprises a hook articulated in such a way on the lever arm of one of said master trap-doors that, in its engaging position with said holding piece, its end is placed in the closing path of a supported trap-door in such manner that on the closing of said supported trap-door, the hook is freed from said holding piece by impact of said supported trap-door on said end.

3. A hopper wagon according to claim 1, wherein said second locking system comprises a bell-crank lever pivoted on a shaft solid with said chassis of the wagon, said hook being provided on the end of one of the arms of said bell-crank lever, the other arm of which comprises a stud sliding in a slide limited by an end-of-travel abutment and provided on an arm pivotally mounted on a supported trap-door, said holding piece being fastened on a master trap-door adjacent to said supported trap-door, while the respective positions of said holding piece, of said bell-crank lever, of said arm comprising said slide and of said end-of-travel abutment of said slide are provided in such manner that on the opening of the trap-doors said holding piece engages said hook and that on the closing of the trap-doors said slide only brings its end-of-travel abutment in contact with said stud while causing a pivoting of said bell-crank lever and the freeing of said holding piece when said supported trap-door has almost reached its closed position.

4. A hopper wagon according to claim 1, wherein said master trap-door of one of the shut-off systems being equipped with said latch arranged in such a way as to engage automatically a corresponding holding member provided on an adjacent supported trap-door of the other shut-off system when the trap-doors reach the open position, the trap-doors being thus held in the open position.

5. A hopper wagon according to claim 3, wherein said hook is fixed to said latch and projects in such a way that the hook engages said holding piece fixed to the chassis of the wagon when the said cam or ramp acts on the latch but retracting, freeing the master trap-door, when the cam or ramp ceases its action on the latch.

6. A hopper wagon according to claim 1, wherein said latch is fixed to a supported trap-door, said holding member being fixed to the chassis of the wagon.

References Cited by the Examiner
UNITED STATES PATENTS

| | | | |
|---|---|---|---|
| 1,749,805 | 3/1930 | Elliott | 298—25 X |
| 2,237,299 | 4/1941 | Benbow et al. | 298—25 |
| 2,721,761 | 10/1955 | LeTourneau | 222—503 X |

ROBERT B. REEVES, *Primary Examiner.*

CHARLES R. CARTER, *Examiner.*